United States Patent
Hagiwara et al.

(10) Patent No.: US 7,117,377 B2
(45) Date of Patent: Oct. 3, 2006

(54) COMPUTER APPARATUS, POWER SUPPLY CONTROL METHOD AND PROGRAM FOR REDUCING THE STANDBY POWER REQUIREMENT IN A COMPUTER SUPPORTING A WAKE-UP FUNCTION

(75) Inventors: Mikio Hagiwara, Yamato (JP); Shigefumi Odaohhara, Yamato (JP); Mitsuhiro Yamazaki, Yokohama (JP)

(73) Assignee: Lenovo (Singapore) Pte Ltd., Singapore (SG)

( * ) Notice: Subject to any disclaimer, the term of this patent is extended or adjusted under 35 U.S.C. 154(b) by 596 days.

(21) Appl. No.: 10/328,807

(22) Filed: Dec. 24, 2002

(65) Prior Publication Data

US 2003/0135726 A1    Jul. 17, 2003

(30) Foreign Application Priority Data

Dec. 26, 2001  (JP) .............................. 2001-395302

(51) Int. Cl.
*G06F 1/26* (2006.01)
(52) U.S. Cl. .................... 713/300; 713/310; 713/320
(58) Field of Classification Search ............... 713/300, 713/320, 323, 324, 310; 709/224
See application file for complete search history.

(56) References Cited

U.S. PATENT DOCUMENTS

| 6,128,658 | A   | * | 10/2000 | McLean ................... 709/224 |
| 6,210,051 | B1  | * | 4/2001  | Sakurai .................... 400/62 |
| 6,308,278 | B1  | * | 10/2001 | Khouli et al. ............. 713/323 |
| 6,654,896 | B1  | * | 11/2003 | Saunders et al. .......... 713/323 |
| 6,701,442 | B1  | * | 3/2004  | Kunz et al. ............... 713/300 |
| 6,760,850 | B1  | * | 7/2004  | Atkinson et al. .......... 713/320 |
| 6,895,515 | B1  | * | 5/2005  | Yamazaki ................ 713/300 |
| 2004/0003307 | A1 | * | 1/2004 | Tsuji ..................... 713/310 |

FOREIGN PATENT DOCUMENTS

| EP | 1265455 A1 | * | 12/2002 |
| JP | 62204315 A | * | 9/1987 |
| JP | 08-234874 |   | 9/1996 |

* cited by examiner

*Primary Examiner*—Thomas Lee
*Assistant Examiner*—Suresh K Suryawanshi
(74) *Attorney, Agent, or Firm*—Patrick J. Daugherty; Driggs, Hogg & Fry Co., LPA

(57) ABSTRACT

In general, the present invention provides a computer apparatus, power supply control method and program for reducing the standby power requirements in a computer supporting a wake-up function. The present invention reduces standby power requirements on power off by three types of control: a wake-up function being set by a user, existence of a device actually capable of realizing the wake-up function, and supplying the power from the auxiliary source only to the device capable of realizing the wake-up function.

16 Claims, 5 Drawing Sheets

PRIOR ART

COMPUTER APPARATUS, POWER SUPPLY CONTROL METHOD AND PROGRAM FOR REDUCING THE STANDBY POWER REQUIREMENT IN A COMPUTER SUPPORTING A WAKE-UP FUNCTION

BACKGROUND OF THE INVENTION

1. Field of the Invention

The present invention relates in general to a computer apparatus, power supply control method and program, and more particularly, to a computer apparatus, method and program having a wake-up function.

2. Description of Related Art

There has been an increasing demand, particularly from an environmentally-oriented viewpoint, to provide for the capability to reduce powering needs with respect to the powering on and powering off of computer-related devices, and more particularly, there is appears to be an increase in the interest of using stand-by power requirements, such as where the power is supplied from a power supply apparatus (such as an AC adapter for instance). According to the powering criteria set forth by Eco Mark™ (trademark of Japan Environment Association) since 2000, the powering on powering off is 1 W or less for a typical computer-related model including the AC adapter with no wake-up function, and 3 W or less for a typical computer-related model with a wake-up function.

As used herein, the term "wake-up function" is a function of starting up a distant computer by turning on the power thereof by remote operation, thereby powering on the computer by an instruction from a network based on an operation at a remote location instead of being turned on manually by an operator locally. WAKE-ON-LAN is a representative instruction set thereof, and such a function allows powered-off computers to be collectively managed at the center.

On the other hand, although power saving strategies for computer apparatuses have been of interest in recent years, emphasis has been placed primarily on power saving options related to battery operation and battery capacity holding time thus far. As a result, the focus has been primarily related to developments that are directly related to functions and apparatuses having AC power supplied from an AC adapter, such that the savings has not necessarily been pursued in terms of the electric power.

For the present invention, the system includes active logic which consumes power during the instantiation of a wake-up even if the power is off. As a result thereof, the models for realizing the wake-up function has the power on the power off increased compared to the cases of having no wake-up function as seen in the criteria of the Eco Mark. More specifically, as for a factor of power consumption on the wake-up, it can be pointed out that a power source for wake-up $V_{AUX}$ of a subject Ethernet adapter is turned on in the case of WAKE-ON-LAN in order to start up a PC by recognizing a specific packet from a network.

Figure 5:
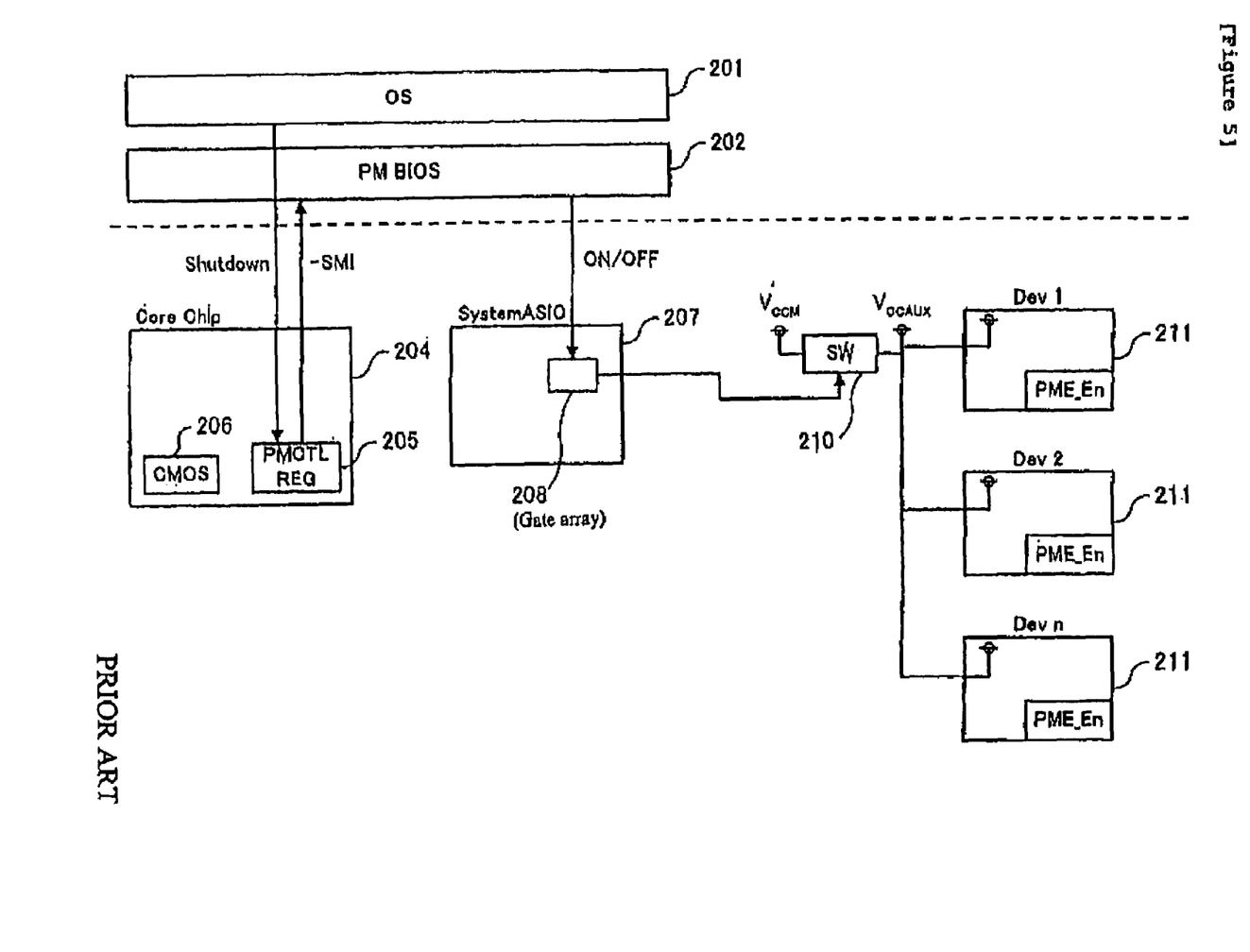
FIG. 5 is a diagram for explaining current control of standby power source.

FIG. 5 is a diagram for explaining current control of standby power source. The current control has an OS (Operating System) 201 which is basic software, a PM BIOS (Basic Input/Output System) 202, a core chip 204, a system ASIC 207 which is an integrated circuit, and a switch 210 turning on and off a main source $V_{CCM}$ and an auxiliary source $V_{CCAUX1}$. In addition, it is arranged so that a plurality of devices 211 (DEV1 to DEVn) are connectable as the devices to which the main source $V_{CCM}$ and auxiliary source $V_{CCAUX1}$ are supplied. The core chip 204 has a CMOS 206 which is a memory changeable by a setup program of a power management control register 205 and PM BIOS 202 for managing a power supply state of a computer system. In addition, the system ASIC 207 has a gate array 208 for performing switch control. The system in FIG. 5 can perform control so as to have the switch 210 switched by the gate array 208 and supply the auxiliary source $V_{CCAUX1}$ as the standby power to the devices 211.

Here, as shown in FIG. 5, the system configuration related to the current power supply adopts a common power source design for the purpose of simplifying the design even in the case where there are a plurality of devices 211. For that reason, even in the case where it is configured to have the auxiliary source $V_{CCAUX1}$ supplied for the sake of power consumption, 30 the auxiliary source $V_{CCAUX1}$ is simultaneously supplied to all the devices 211 by switching the switch 210. As a result thereof, it requires unnecessary standby power requirement for the devices having no wake-up function so that the overall standby power requirement increases and so a sufficient power saving effect is not obtained.

In addition, power control during battery operation is currently performed by the system. However, the power for wake-up on the power off is not controlled in a state of being connected to the AC power in particular. As a result thereof, the standby power is supplied to the system regardless of whether or not a device being able to realize the wake-up function is included and whether or not the wake-up function is set up, and so wasteful power has been consumed.

The present invention has been achieved in order to solve the above technical problems, and an object thereof is to reduce the standby power requirement in the computer apparatus supporting the wake-up function.

SUMMARY OF THE INVENTION

Accordingly, there is a need for an apparatus, method and system that overcomes the problems discussed above. The present invention reduces standby power requirements on power off by three types of control: a wake-up function being set by a user, existence of a device actually capable of realizing the wake-up function, and supplying the power from the auxiliary source only to the device capable of realizing the wake-up function. For the present invention, a computer apparatus comprises a function setup means for enabling or disabling a wake-up function which enables to start up a system by operation from a remote site, storage means for storing information on being enabled or disabled set by the function setup means, confirmation means for confirming the information on being enabled or disabled stored in the storage means upon receiving a request for system shutdown; and power off means for supplying power from an auxiliary source to the device which may realize the wake-up function if the confirmation means determines that the wake-up function is enabled and for executing power off of the system by terminating power supply to the device from the auxiliary source if determined that the wake-up function is disabled.

For the present invention, it is also desirable from the viewpoint of curbing wasteful standby power to further include a determination means for determining whether or not the device being able to realize the wake-up function among the connected devices is included therein, and the power off means executes the power off of the system by terminating the power supply from the auxiliary source when determined by the determination means that there is no actual device being able to realize the wake-up function. This "device being able to realize the wake-up function" is the device supporting Ethernet capable of realizing the WAKE-ON-LAN function for instance, and the determination means just has to determine whether or not it is an Ethernet device, for instance, such that it does not always need to determine whether or not to actually perform the wake-up.

In one aspect, the present invention is a computer apparatus connectable to the device being able to realize a wake-up function, comprising a wake-up power source for supplying power for wake-up to the connected devices on power-off; determination means for determining whether or not the device being able to realize the wake-up function is included therein by a device class or an ID obtained from the device, and controlling means for controlling the power supply from the wake-up power source to be off in the case where the determination means determines that no device being able to realize the wake-up function is included therein.

In another aspect, the computer apparatus of the present invention comprises a switching means for turning on and off the power for wake-up to the connected devices, and controlling means for controlling the switching means to supply the power for wake-up to the device being able to realize the wake-up function and not to supply the power for wake-up to the device being unable to realize the function on power off. Here, the switching means is characterized by providing a switch for turning on and off power supply from a wake-up power source to each of a plurality of connectors to which the devices are connectable and controls the switch based on a type of the device connected to each of the plurality of connectors.

In another aspect, the present invention is a power supply control method in the computer apparatus being able to realize the wake-up function, comprising the steps of storing setup information on the wake-up function being enabled or disabled, and supplying the power from the auxiliary source to the device which may realize the wake-up function if the wake-up function is enabled according to the stored setup information, and executing the power off of the system by terminating the power supply to the device from the auxiliary source if the wake-up function is disabled. In this aspect and for the case where the wake-up function is disabled, according to the stored setup information, the power supply from the auxiliary source to all the devices of performing communication with the outside is stopped.

Additionally, in a further aspect, the present invention is a power supply control method of supplying the power for wake-up to the device being able to realize the wake-up function, comprising the steps of determining whether or not the device being able to realize a wake-up function is connected, such as whether or not the device supports Ethernet, and in for the case of determining that the device being able to realize the wake-up function is not connected, turning off supply of the power for wake-up.

In a further aspect, the power supply control method further comprises the step of supplying on the power off the power for wake-up to the device being able to realize the wake-up function, of a plurality of connected devices, and performing control not to supply the power for wake-up to the device being unable to realize the wake-up function of the plurality of connected devices on the power off.

In a further aspect, the power supply control method comprises the steps of receiving a request for shutdown during operation of the system, performing an OS shutdown process, performing a BIOS shutdown process, and in the case where and the device of which the wake-up function is set as enable and being able to realize the wake-up function is connected, supplying the power for wake-up to the device.

Additionally, the present invention may also be considered as a program to be executed by the computer. In this aspect, the present invention includes program code for executing the procedures of storing setup information on the wake-up function being enabled or disabled, and in the case where the wake-up function is set to be enabled according to the stored setup information, maintaining the power supply to the device from the auxiliary source on the power off; and in the case where the wake-up function is set to be disabled according to the stored setup information, stopping the power supply to the device from the auxiliary source on the power off. The device may be the plurality of devices connected to the computer, for instance, and all the devices connectable to an interface to which the power from the auxiliary source is supplied.

In another aspect, the present invention is a program causing the computer to execute the procedures of determining whether or not the device being able to realize the wake-up function is connected, and in case of determining that the device being able to realize the wake-up function is not connected, stopping the supply of the power for wake-up to the device on power off.

In another aspect, the present invention is a program comprising code causing the computer to execute the procedures of, as to the plurality of connected devices, determining whether or not they are the devices being able to realize the wake-up function, maintaining the supply of the power for wake-up from the auxiliary source to the device being able to realize the wake-up function of the plurality of devices on power off; and stopping the supply of the power for wake-up from the auxiliary source to the devices being unable to realize the wake-up function of the plurality of devices on the power off.

As for the method of providing these programs, the form of providing the program to be executed by the computer on a medium for storing it to be readable to the computer is thinkable. As for this readable medium, it includes a storage medium and a transmission medium. The storage medium such as a floppy disk and a CD-ROM media are applicable for instance, but the present invention is not so limited. In one aspect of operation of the program code, the program is preferably read by a floppy disk drive or a CD-ROM reading apparatus and stored in a flash ROM or the like in the computer so as to be executed. In addition, the transmission medium such as network is usable by a program transmitting apparatus to provide the program to the computer. As for the program transmitting apparatus, it is sufficient to have a memory for storing the program and program transmitting means for providing the program via the network.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures. The preferred embodiments of the present invention and its advantages are best understood by referring to the drawings, like numerals being used for like and corresponding parts of the various drawings.

Figure 1:
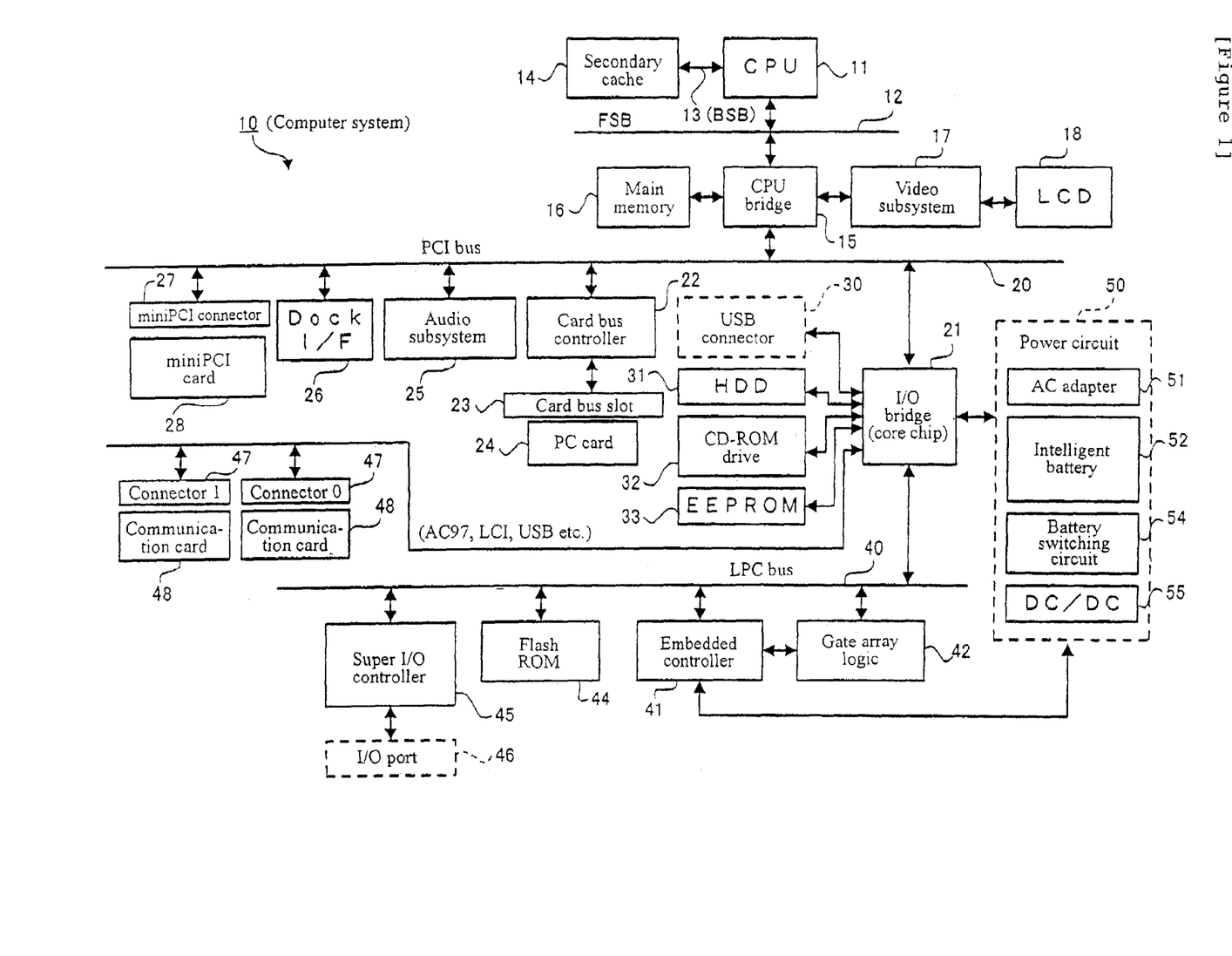
FIG. 1 is a diagram showing a hardware configuration of a computer system which is an electric apparatus for a preferred embodiment of the present invention.

FIG. 1 is a diagram showing a hardware configuration of a computer system 10 which is an electric apparatus for a preferred embodiment of the present invention. The computer having the computer system 10 (hereafter, it may be simply referred to as the "system") is constituted as a notebook-sized personal computer (notebook PC) having a predetermined OS mounted thereon in compliance with OADG (Open Architecture Developer's Group) specifications for instance.

In the computer system 10 shown in FIG. 1, a CPU 11 functions as the "brain" of the entire computer system 10, and executes various programs in addition to a utility program under the control of the OS. The CPU 11 is mutually connected with the components via three stages of buses, that is, an FSB (Front Side Bus) 12 which is a system bus, a PCI (Peripheral Component Interconnect) bus 20 as the bus for a high-speed I/O apparatus and an LPC (Low Pin Count) bus 40 as the bus for an I/O apparatus. The CPU 11 accelerates processing by storing a program code and data in a cache memory. In recent years, the CPU 11 has SRAM of 128 Kbytes or so as a primary cache integrated therein, and also has a secondary cache 14 of 512K to 2 Mbytes or so via a dedicated bus BSB (Back Side Bus) 13 in order to augment shortage of capacity. Moreover, it is possible to reduce the costs by omitting BSB 13, connecting the secondary cache 14 to the FSB 12 and avoiding a package with many terminals.

The FSB 12 and the PCI bus 20 are connected by a CPU bridge (host to PCI bridge) 15 called a memory/PCI chip. The CPU bridge 15 has a configuration including a memory controller function of controlling access operation to a main memory 16 and a data buffer for absorbing a difference in data transfer rate between the FSB 12 and the PCI bus 20. The main memory 16 is a writable memory to be used as a read area of an executed program of the CPU 11 or as a work area for writing processing data of the executed program, and for instance, it is comprised of a plurality of DRAM chips and has 64 MB as standard equipment and is capable of adding up to 320 MB for instance. This executed program includes firmware such as various drivers for hardware-operating the OS and the peripherals, an application program intended for a specific application, and a BIOS (Basic Input/Output System) stored in a flash ROM 44 mentioned later.

A video subsystem 17 is a subsystem for implementing the functions related to video, and includes a video controller. This video controller processes a plotting instruction from the CPU 11, writes the processed plotting information to a video memory and also reads this information from the video memory so as to output it as plotting data to a liquid crystal display (LCD) 18.

The PCI bus 20 is a bus capable of comparatively high-speed data transfer, and is standardized by specifications wherein data bus width is 32 bits or 64 bits, maximum operating frequencies are 33 MHz and 66 MHz, and maximum data transfer rates are 132 MB/second and 528 MB/second. The PCI bus 20 has an I/O bridge 21, a card bus controller 22, an audio subsystem 25, a docking station interface (Dock I/F) 26 and a miniPCI connector 27 connected thereto respectively.

The card bus controller 22 is a dedicated controller for directly connecting a bus signal of the PCI bus 20 to an interface connector (card bus) of a card bus slot 23, and the card bus slot 23 can have a PC card 24 loaded thereon. The docking station interface 26 is the hardware for connecting a docking station (not shown) which is a feature expansion apparatus of the computer system 10.

If the notebook PC is set on the docking station, various hardware elements connected to an internal bus of the docking station are connected to the PCI bus 20 via the docking station interface 26. In addition, the miniPCI connector 27 has a miniPCI card 28 connected thereto.

The I/O bridge 21 has a bridge function between the PCI bus 20 and the LPC bus 40. In addition, it has a DMA controller function, a programmable interrupt controller (PIC) function, a programmable interval timer (PIT) function, an IDE (Integrated Device Electronics) interface function, a USB (Universal Serial Bus) function and an SMB (System Management Bus) interface function, and also has a real time clock (RTC) built in.

The DMA controller function is a function of performing data transfer between the peripherals such as an FDD and the main memory 16 with no involvement of the CPU 11. The PIC function is the function of having a predetermined program (interrupt handler) executed in response to an interrupt request (IRQ) from the peripherals. The PIT function is the function of having a timer signal periodically generated. In addition, the interface implemented by the IDE interface function has an IDE hard disk drive (HDD) 31 connected thereto, and also has a CD-ROM drive 32 ATAPI (AT Attachment Packet Interface)-connected. Instead of the CD-ROM drive 32, another type of an IDE apparatus such as a DVD (Digital Versatile Disc) drive may be used. External storages such as the HDD 31 and the CD-ROM drive 32 are stored in a repository called a "media bay" or a "device bay" in the notebook PC proper. It is also envisioned that there may exist the case where these external storages, as the standard equipment, are mounted to be replaceable with other apparatuses such as an FDD or a battery pack and the like.

In addition, the I/O bridge 21 has a USB port provided thereto, and the USB port is connected to a USB connector 30 provided on a wall of the notebook PC proper for instance. Furthermore, the I/O bridge 21 has an EEPROM 33 connected thereto via an SM bus. The EEPROM 33 is the memory for holding the information such as a password, a supervisor password, a product serial number and so on registered by the user, and is nonvolatile with stored contents electrically rewritable. In addition, a plurality of connectors 47 are connected from the I/O bridge 21 via an AC 97 (audio CODEC '97) for supporting a modem function, an LCI (LAN Connect Interface) which is the interface to Ethernet built into a core chip, a USB and so on. Each of the plurality of connectors 47 is constituted so as to allow a communication card 48 to be connected thereto. Furthermore, the I/O bridge 21 is connected to a power circuit 50. The power circuit 50 has an AC adapter 51 for performing AC/DC conversion by being connected to mains of AC100V for instance, an intelligent battery 52 as a battery (secondary battery) comprised of a nickel hydrogen battery and a nickel cadmium battery used by repeatedly charging and discharging, the circuits such as a battery switching circuit 54 for switching between an AC power from the AC adapter 51 and battery power from the intelligent battery 52, and a DC/DC converter (DC/DC) 55 for generating DC constant voltage used by the computer system 10 such as +15V, +5V and +3.3V or the like. The intelligent battery 52 is the intelligent battery having the CPU inside and performing communication with an embedded controller 41 (mentioned later) in compliance with SBS (Smart Battery system). According to this embodiment, the intelligent battery 52 is constituted to be able to be mounted on and removed from the system of the notebook PC as the battery pack for instance.

In another aspect, inside the core chip constituting the I/O bridge 21, there is provided an internal register for managing a power state of the computer system 10 and a logic (a state machine) for managing the power state of the computer system 10 including operation of this internal register. This logic sends and receives various signals to and from the power circuit 50, and thereby recognizes an actual feeding state from the power circuit 50 to the computer system 10. The power circuit 50 controls the power supply to the computer system 10 according to an instruction from this logic.

The LPC bus 40 is an interface standard for connecting a legacy device to a system having no ISA bus, and sends and receives a command, an address and data by using the same four signal lines (LAD signal) with 33 MHz operation clock (sends 8 bits by 4 bits×2 clocks in the case of the data for instance). The LPC bus 40 has an embedded controller 41, a gate array logic 42, a flash ROM 44 and a super I/O controller 45 connected thereto. Furthermore, it is used for connecting the peripherals operating at a comparatively low speed such as a keyboard and a mouse controller. The super I/O controller 45 has an I/O port 46 connected thereto, and controls driving of the FDD, parallel data input-output (PIO) via a parallel port and serial data input-output (SIO) via a serial port.

The embedded controller 41 controls the keyboard not shown, and is also connected to the power circuit 50 to be responsible for a part of a power management function by means of a built-in power management controller (PMC) together with the gate array logic 42.

Figure 2:
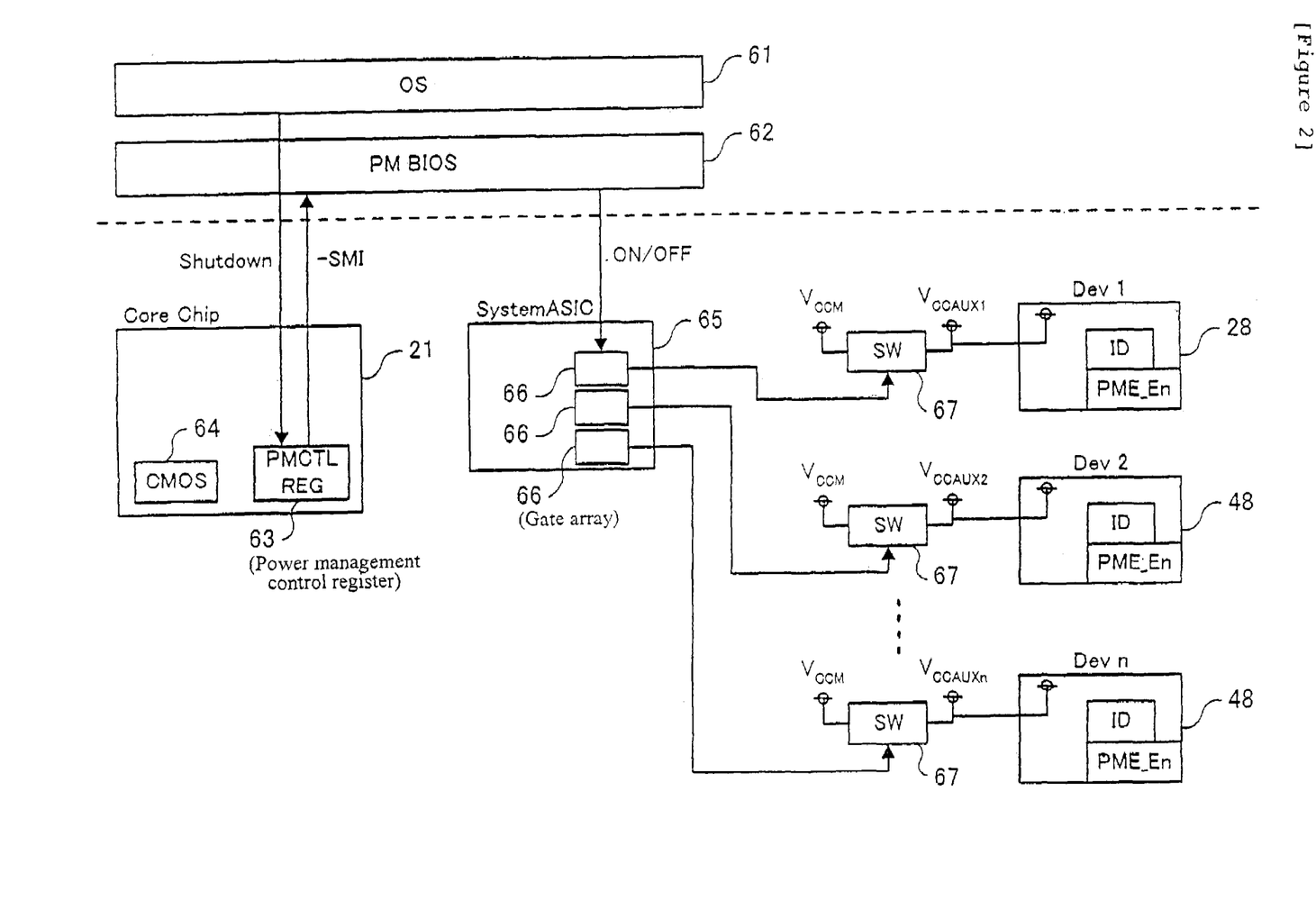
FIG. 2 a block diagram for performing new control of a standby power source for a preferred embodiment of the present invention.

FIG. 2 is a block diagram for performing new control of a standby power source for the present invention in a preferred embodiment. Here, the present invention reduces the power by the following three types of control: (1) When the wake-up function is set for use by the user; (2) When the device actually capable of the wake-up (device being able to realize the wake-up function) exists; and (3) Supplying standby power only to the device being able to realize the wake-up function. According to the block configuration shown in FIG. 2, it is possible to reduce consumption of wake-up power (standby power) by supplying the power on the wake-up only to the device being able to realize the wake-up function and turning off the power other than that. Moreover, as previously mentioned, the wake-up function is the function of turning on the power of the computer which is in a power off state by remote operation and starting it up, so that it allows the power to be turned on according to the instruction from a network based on the operation at a remote location instead of being turned on manually by an operator.

The computer system 10 has a condition set by a core logic on a previous shutdown stored as soft off state, and there exists the state wherein the wake-up is feasible with an RTC timer or the like. In addition, there exists the state wherein the core logic is a default (when connected to the AC adapter 51 and an AC power exists) or has no power supplied thereto (when no AC power exists). The WAKE-ON-LAN function which is a representation of the wake-up function can perform the wake-up from either of the above-mentioned off states when the AC power exists. This is primarily as the WAKE-ON-LAN function is likely be used only when the AC power exists, since it basically assumes use as a part of office equipment. Alternatively, as for the wake-up from Bluetooth source, which is another wake-up function, there is included a mechanism for waking up by means of a battery even when it is off; this is primarily as the Bluetooth aspect is assumed to be in a mobile environment since it is radio communication. Therefore, the "power off state" in this embodiment is the power off state for the particular wake-up function.

In controlling such a new standby power source, this present invention prepares as software an OS (Operating System) 61 which is software executed by the CPU 11 and a PM BIOS (Basic Input/Output System) 62 which is a program for controlling various devices related to power management (PM). In addition, the computer system 10 has a power management control register 63 for the power management and a CMOS 64 which is a nonvolatile memory in the I/O bridge 21 which is the core chip. At the time of executing power off of the system, "Enter a state of shutdown" is written from the OS 61 to the power management control register 63, and the PM BIOS 62 can operate based on a signal from the power management control register 63 based on the writing. Various setup information from the PM BIOS 62 is stored in the CMOS 64, and a setting of enable and disable of the WAKE-ON-LAN (performing the wake-up via an LAN on the power off) are also stored therein. This embodiment is constituted so that the supply of power for wake-up is stopped when the setting is disable and the power for wake-up is supplied only when it is actually enable.

A system ASIC 65 which is an integrated circuit including the gate array logic 42 shown in FIG. 1 has a plurality of gate arrays 66 for performing switch control, and the gate array 66 has a register for the switch control and its output and is operated by the control of the PM BIOS 62. In addition, according to this embodiment, each of the miniPCI card 28 and the various communication cards 48 is provided a switch 67 for turning on and off a main source $V_{CCM}$ and for turning on and off auxiliary sources $V_{CCAUX1}$ to $V_{CCAUXn}$ supplied thereto from the DC/DC converter 55 corresponding to each card (a connector (slit) for rendering the device having the wake-up function connectable). Each of the switches 67 is controlled by the gate array 66. The auxiliary sources $V_{CCAUX1}$ to $V_{CCAUXn}$ are supplied as the power for performing the wake-up from the DC/DC converter 55, and supplies 3.3V for instance to each device (the miniPCI card 28 and the various communication cards 48) on the power off. In the system configuration shown in FIG. 2, the configuration thereof is different from the current system configuration in that the switch 67 for turning on and off the power is provided to each device, and each switch 67 is controlled to be turned on and off by the gate array 66. Thus, it is possible to supply the power for wake-up only to the device being able to realize the wake-up function.

In addition, the present invention has the function of recognizing whether or not there actually exists the device being able to realize the wake-up function. For instance, the wake-up in the power off state is performed in the configuration wherein the WAKE-ON-LAN is performed by an Ethernet adapter. Thus, it has the configuration wherein it is checked whether or not there exists an Ethernet card as the device being able to realize the wake-up function, and if it exists, the power is supplied from the auxiliary sources $V_{CCAUX1}$ to $V_{CCAUXn}$ which are wake-up power sources, and if the device being unable to realize the wake-up function such as a modem is connected, no power is supplied from the wake-up power sources.

As for the method of recognizing the device, as to whether or not the miniPCI card 28 has the wake-up function for instance, there is a method of checking whether or not it is the Ethernet by seeing fields of a device class and a device subclass in a configuration space (PCI Config. Space) in which the PM BIOS 62 is a register set. In addition, as to whether or not the communication card 48 has the wake-up function, it can be recognized by the gate array 66 and the super I/O controller 45 shown in FIG. 1 for instance by means of a system unique ID which the communication card 48 has. Additionally, for the present invention, although it is envisioned that there may exist certain situations where the Ethernet does not realize the wake-up function, it not necessary for the present invention to distinguish such cases. It is possible, however, to configure the present invention so as to strictly determine whether or not a device can perform the wake-up function.

Figure 3:
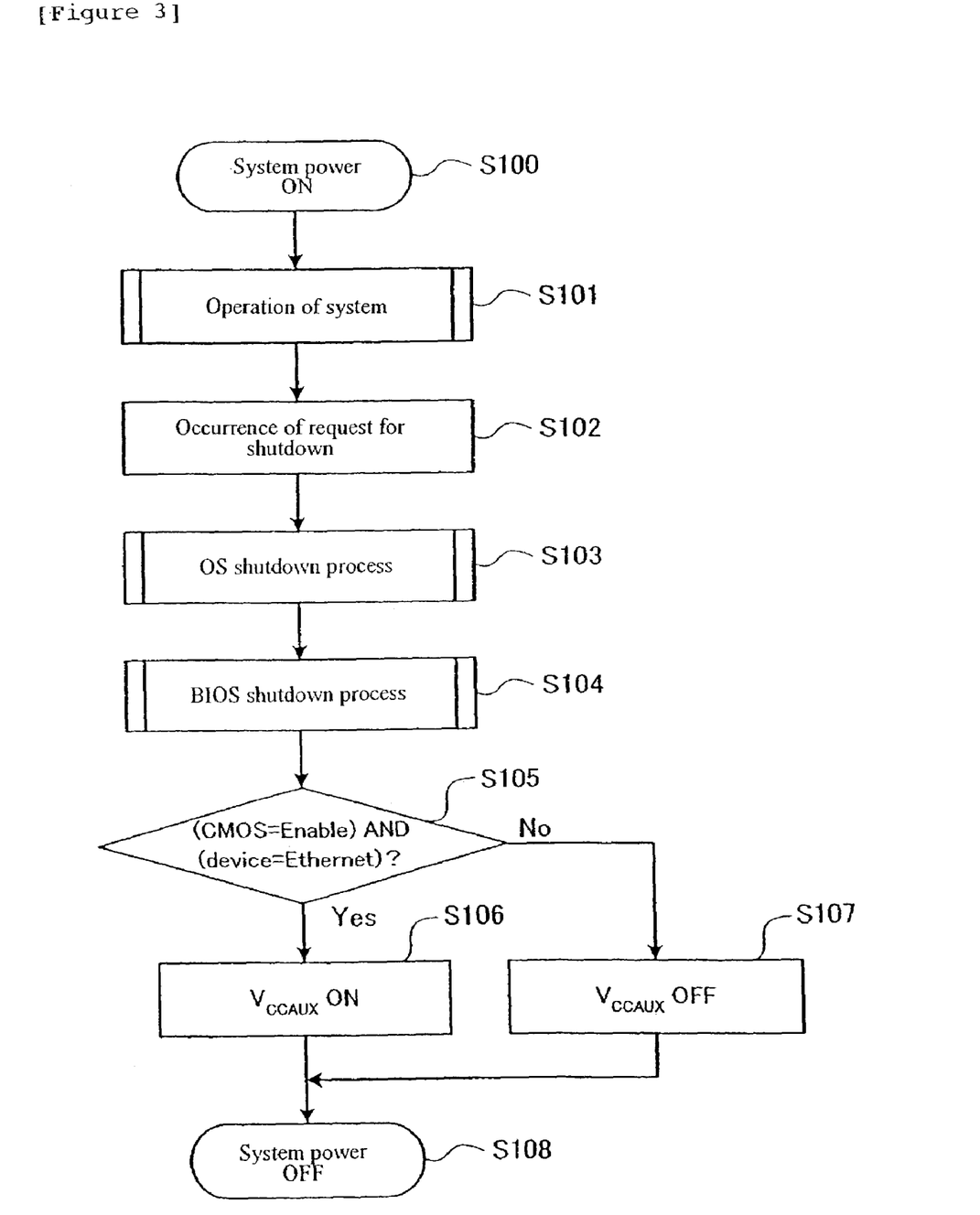
FIG. 3 is a flowchart showing a shutdown process for a preferred embodiment of the present invention.

FIG. 3 is a flowchart showing a shutdown process performed for the present invention in a preferred embodiment. On power on of the system (step 100), various operations of the system are performed by the CPU 11 (step 101). Subsequently, the OS 61 performed by the CPU 11 recognizes by way of the PM BIOS 62 an occurrence of a request for a shutdown such as selection of a shutdown menu in the OS 61 by the user for instance (step 102), and the shutdown process is performed by the OS 61 (step 103). That is, a HAL (Hardware Abstraction Layer) of the OS 61 writes the shutdown to the power management control register 63. The power management control register 63 has an SMI (System Management Interrupt) outputted by this writing operation. Accordingly, the logic (south bridge) of the system is equipped with a function of outputting a request for the SMI interruption of which factor is the writing to the power management control register 63.

Thereafter, a handler process in the power management control register 63 is called, and the shutdown process of the PM BIOS 62 is performed (step 104). The shutdown process checks whether or not the WAKE-ON-LAN in the CMOS 64 is enable for instance, and examines the ID of the device to determine whether or not the device is the Ethernet (step 105). In the case where the WAKE-ON-LAN is enabled and the device is the Ethernet, the gate array 66 is controlled to operate the switches 67, and the auxiliary source $V_{CCAUX}$ to the connector (slit) to which the applicable device is connected is turned on (step 106). In the case where the WAKE-ON-LAN is not enabled and the wake-up function is not set for use by the user, the auxiliary sources $V_{CCAUX}$ to all the connectors (all the connectors to which the device connectable to an interface for having the power supplied from the auxiliary sources can be connected) are turned off. Further, in the case where the WAKE-ON-LAN in the CMOS 64 is enabled but the device which is not the Ethernet exists, the gate array 66 is controlled to operate the switches 67, and the auxiliary source $V_{CCAUX}$ to the connector (slit) to which the device which is not the Ethernet is connected is turned off (step 107). If the process in steps 106 and 107 is finished, the system moves on to the state written to the power management control register 63 so as to be the system power off (step 108).

For the present invention, when executing the power off, there are many cases where the system is changed to the state called mechanical off not only by writing to the power management control register 63 but by other means. There are also the cases where the power of the system is turned off by writing to the power management control register 63, which is the state called soft off. The soft off is used in limited cases such as the cases of moving on to hibernation (S4) with the OS of ACPI (Advanced Configuration and Power Interface) which is a power control interface of Windows 2000®, Windows XP® and so on of Microsoft Corp. and the cases of moving on to hibernation in the state of being connected to a docking station with the OS of APM (Advanced Power Management) which is a power saving standard of Windows 95, Windows 98SE and the like.

Moreover, while the process in the ACPI was described in the above-mentioned description of FIG. 3, the process in the APM is as follows. In step 102 shown in FIG. 3, after performing the shutdown process such as the selection of the shutdown menu in the OS 61 by the user, a power off event of the APM calls the process of each device driver and the PM BIOS 62 in the shutdown process of the OS 61 in step 103. And in the shutdown process of the PM BIOS 62 in step 104, a defined process is called from a table defining the process on the shutdown. The processing is defined in the called process so that the processing of the aforementioned step 105 and thereafter shown in FIG. 3 is called. Thereafter, if all the processing is finished, the PM BIOS 62 writes a value of the shutdown to the power management control register 63 so as to execute the power off (step 108).

Figure 4:
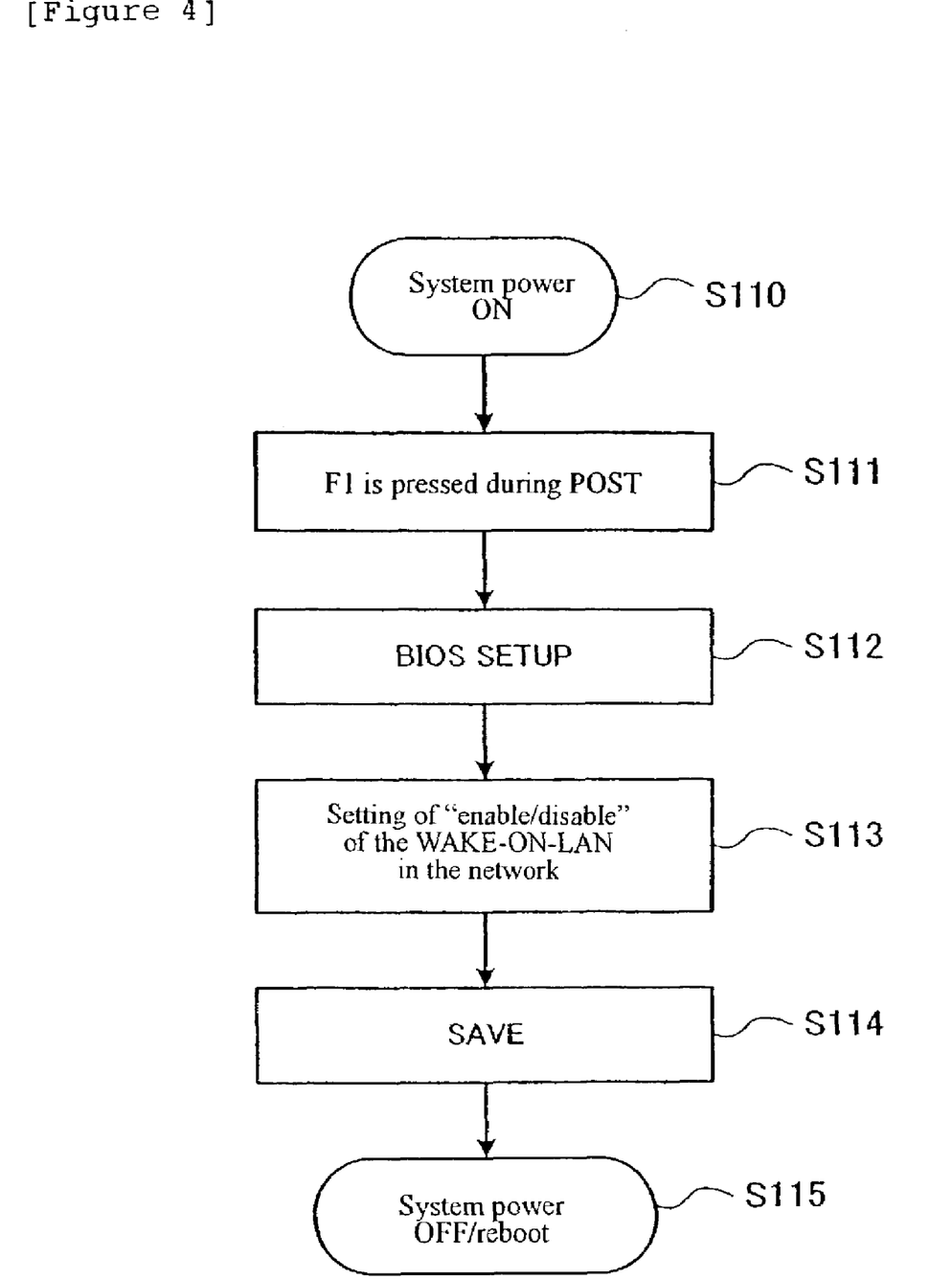
FIG. 4 is a flowchart showing a flow of a setting process of a CMOS.

FIG. 4 is a flowchart showing a flow of a setting process of the CMOS 64. First, on the power on of the system (step 110), if an F1 key is pressed by the user during POST (Power ON Self Test) (step 111), the program of "BIOS SETUP" for changing the setup of the CMOS 64 in the PM BIOS 62 is called (step 112). The setting of "enable/disable" of the WAKE-ON-LAN in the network can be changed by a menu therein (step 113). This setting is saved in the CMOS 64 by pushing the key for saving the change (step 114). Thereafter, the user can execute the power off or reboot of the system (step 115), and the system operates based on the new setting thereafter. Thus, the present invention allows the setting of use/nonuse in the wake-up function during the power off by utilizing the area in the CMOS 64.

As described above, the present invention includes load switches (switches 67) for turning on and off the wake-up power source, the mechanism necessary for controlling the wake-up power source and a setting function of use/nonuse of the wake-up function during the power off, where the setting of the wake-up function is referred to and the wake-up power source is turned off on the shutdown of the system (computer 10) in the nonuse setting of the wake-up. In addition, the present invention includes the function of recognizing the devices connected to the system is provided so that the wake-up power source is turned off even in the use setting of the wake-up function in the case where there is no device being able to perform the wake-up. Furthermore, in the case where there are a plurality of the devices being able to perform the wake-up, a power control mechanism is performed to each of them to control it independently so that the wake-up power sources for the rest of the devices are turned off leaving only the wake-up power source for the necessary device. It is thereby possible to reduce the standby power requirement in the computer system 10 equipped with the communication cards 48 having the WAKE-ON-LAN function and the miniPCI card 28. In addition, it is possible to prevent power consumption from increasing except when actually using the WAKE-ON-LAN function.

Moreover, although the present invention is described by setting forth the aforementioned examples, the wake-up functions of the LAN and Bluetooth supporting the WAKE-ON-LAN function, the present invention is also likewise applicable to cases where other communication means such as the modem has the wake-up function.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer apparatus comprising:
   a function setup means for enabling or disabling a wake-up function to start up a system by operation from a remote site;
   a storage means for storing information on being enabled or disabled set by said function setup means;
   a confirmation means for confirming said information on being enabled or disabled stored in said storage means upon receiving a request for system shutdown;
   a determination means that determines whether or not the at least one device is able to realize the wake-up function; and
   a power off means for supplying power from an auxiliary source to at least one device which may realize the wake-up function if said confirmation means determines that said wake-up function is enabled and for executing power off of the system by terminating power supply to the device from the auxiliary source if determined that said wake-up function is disabled, and wherein said power off means executes the power off of said system by terminating the power supply from said auxiliary source when determined by said determination means that there is no at least one device being able to realize said wake-up function.

2. The computer apparatus according to claim 1, wherein said power off means executes the power off of the system by:
   supplying the power from said auxiliary soiree to the at least one device if the at least one device is able to realize the wake-up function; and
   turning off the power from the auxiliary source to the at least one device if the at least one device is unable to realize the wake-up function.

3. A computer apparatus capable of receiving a device being able to realize a wake-up function, comprising:
   a wake-up power source for supplying power for wake-up to a plurality of connected devices on power-of;
   a determination means for determining whether or not at least one of the plurality of devices is able to realize said wake-up function; and
   a controlling means for controlling power supply from said wake-up power source, the controlling means configured to turn off wake-up power source power to the plurality of connected devices where the determination means determines that no device being able to realize said wake-up function is included in the plurality of connected devices.

4. The computer apparatus according to claim 3, wherein said determination means determines whether or not said wake-up function can be realized by a device class or an ID obtained from said device.

5. A power supply control method of supplying power for wake-up for realizing a wake-up function to a predetermined device on power off, comprising the steps of:
   supplying on power off said power for wake-up to a first device of a plurality of connected devices when the first device is predetermined as able to realize the wake-up function; and
   performing control not to supply said power for wake-up to a second device of the plurality of connected devices when the second device is predetermined as unable to realize the wake-up function on power off.

6. An article of manufacture comprising a computer usable medium having a computer readable program embodied in said medium, wherein the computer readable program, when executed on a computer, causes the computer to execute the procedures of:
   storing setup information on a wake-up function being enabled or disabled;
   determining whether or not a connected device is able to realize a wake-up function;
   if said wake-up function is set to be enabled according to said stored setup information and it is determined tat the connected device is able to realize said wake-up function, then maintaining power supply to the connected device from an auxiliary source on power off; and
   if said wake-up function is set to be disabled according to said stored setup information or it is determined that the connected device is not able to realize said wake-up function, then stopping the power supply to said connected device from said auxiliary source on power off.

7. An article of manufacture comprising a computer storage medium having a computer readable program embodied in said medium, wherein the computer readable program, when executed on a computer, causes the computer to execute the procedures of:
   as to a plurality of devices connected to a computer system, determining whether or not each of the plurality of devices is able to realize a wake-up function;
   maintaining supply of power for wake-up from an auxiliary source to each of at least one first device of the plurality of devices determined as able to realize the wake-up function on power off; and
   stopping the supply of power for wake-up from said auxiliary source to each of at least one second device of the plurality of devices determined as unable to realize the wake-up function on power off.

8. The computer apparatus according to claim 2, wherein the at least one device is a plurality of devices, and the power off means includes a plurality of switches, each one of the plurality of devices connected to each one of the switches; and
   wherein the power off mesas executes the power off of the system by supplying the power from said auxiliary source to a plurality first device through a first switch if the first device is able to realize the wake-up function, and turning off the power from the auxiliary source to a plurality second device by turning off a plurality second switch if the second device is unable to realize the wake-up function.

9. The computer apparatus according to claim 3, wherein said controlling means further comprises a switching means for turning on and off power for wake-up to the plurality of connected devices; and wherein the controlling means is configured to control said switching means to supply said power for wake-up to a first connected device of the plurality of connected devices when the first device is able to realize the wake-up function and not supply said power for wake-up to a second connected device of the plurality of connected devices when the second device is unable to realize the function on power off.

10. The computer apparatus according to claim 9, wherein said switching means provides a switch for turning on and off power supply from a wake-up power source to each of a plurality of connectors to which each of the plurality of devices are connectable and controls the switch based on a type of each of the plurality of devices connected to each of the plurality of connectors.

11. The computer apparatus according to claim 9, wherein said controlling means determines whether or not a connected device supports the Ethernet, said controlling means configured to supply said power for wake-up to a connected device supporting Ethernet and to not supply said power to a connected device not supporting Ethernet.

12. The power supply control method according to claim 5, further comprising the step of storing setup information on said wake-up function being enabled or disabled;

wherein the step of supplying on power off said power for wake-up to the first device is performed when the first device is predetermined as able to realize the wake-up function according to said stored setup information; and wherein the step of performing control not to supply said power for wake-up to the second device is performed when the second device is predetermined as unable to realize the wake-up function according to said stored setup information.

13. The power supply control method according to claim 12, further comprising the steps of stopping power supply from the auxiliary source to any device performing communication outside of the computer system if said wake up function is disabled according to said stored setup information.

14. The power supply control method according to claim 5, further comprising the steps of:

determining whether or not the first device is connected to a power supply; and turning off supply of said power for wake-up if determined that the first device is not connected to a power supply.

15. The power supply control method according to claim 5, further comprising the steps of:

predetermining the first device as able to realize the wake-up function by determining whether or not the device supports Ethernet; and predetermining the second device as unable to realize the wake-up function on power off by determining whether or not the device supports Ethernet.

16. The power supply control method according to claim 5, further comprising the steps of:

receiving a request for shutdown during operation of a system;

performing an OS shutdown process;

performing a BIOS shutdown process; and supplying on power off said power for wake-up to the first device if a wake-up function is set as enable.

* * * * *